US011975543B2

(12) United States Patent
Yashiro et al.

(10) Patent No.: US 11,975,543 B2
(45) Date of Patent: May 7, 2024

(54) LIQUID REPLENISHING SYSTEM

(71) Applicant: CANON KABUSHIKI KAISHA, Tokyo (JP)

(72) Inventors: Takanori Yashiro, Kawasaki (JP); Chiaki Muraoka, Kawaguchi (JP); Tatsuo Nanjo, Kawasaki (JP); Hirofumi Okuhara, Tokyo (JP); Kazumasa Matsushita, Kawasaki (JP); Yuji Tamaru, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/689,823

(22) Filed: Mar. 8, 2022

(65) Prior Publication Data

US 2022/0184961 A1 Jun. 16, 2022

Related U.S. Application Data

(63) Continuation of application No. 16/985,049, filed on Aug. 4, 2020, now Pat. No. 11,298,945.

(30) Foreign Application Priority Data

Aug. 27, 2019 (JP) ................................ 2019-154714
Mar. 27, 2020 (JP) ................................ 2020-057934

(51) Int. Cl.
*B41J 2/175* (2006.01)

(52) U.S. Cl.
CPC ....... *B41J 2/17509* (2013.01); *B41J 2/17506* (2013.01); *B41J 2/17523* (2013.01); *B41J 2/17596* (2013.01)

(58) Field of Classification Search
CPC .... B41J 2/175; B41J 2/17503; B41J 2/17506; B41J 2/17509; B41J 2/17513;
(Continued)

(56) References Cited

U.S. PATENT DOCUMENTS 3,941,171 A * 3/1976 Ogle .................... A61J 1/2089 604/413
6,969,161 B2 * 11/2005 Kuwabara ............ B41J 2/17509 347/85

(Continued)

FOREIGN PATENT DOCUMENTS

JP 2019069550 A 5/2019
JP 2020100110 A 7/2020
JP 2021030727 A 3/2021

*Primary Examiner* — Anh T Vo
(74) *Attorney, Agent, or Firm* — Canon U.S.A., Inc. I.P. Division

(57) ABSTRACT

A liquid replenishing system includes a liquid tank and a liquid storage bottle for storing liquid to be replenished to the liquid tank. The liquid tank includes a tank body, a cylindrical adapter, and a needle penetrating into the tank body inside the cylindrical adapter. One end of the needle is located outside the tank body and another end of the needle is located inside the tank body. The liquid storage bottle includes a bottle body, a nozzle having an ejection port for ejecting a liquid stored in the bottle body, and includes a slit valve provided at the ejection port. In a case where the nozzle of the liquid storage bottle and the cylindrical adapter of the liquid tank are fitted to each other, one end of the needle is inserted into the slit valve so that the liquid storage bottle is secured to the liquid tank.

17 Claims, 10 Drawing Sheets

(58) Field of Classification Search
CPC .. B41J 2/1752; B41J 2/17523; B41J 2/17553; B41J 2/17596; B41J 2/19; B41J 29/13
See application file for complete search history.

(56) References Cited

U.S. PATENT DOCUMENTS

| | | | | |
|---|---|---|---|---|
| 2002/0054193 | A1* | 5/2002 | Wakayama | B41J 2/17556 347/86 |
| 2018/0001650 | A1* | 1/2018 | Miyashita | B41J 2/17506 |
| 2018/0272722 | A1 | 9/2018 | Murphy | |
| 2018/0272723 | A1* | 9/2018 | Shinada | B41J 2/17509 |

* cited by examiner

LIQUID REPLENISHING SYSTEM

CROSS REFERENCE TO RELATED APPLICATIONS

The present application is a continuation of U.S. patent application Ser. No. 16/985,049, filed on Aug. 4, 2020, which claims the benefit of Japanese Patent Application No. 2019-154714, filed Aug. 27, 2019, and Japanese Patent Application No. 2020-057934, filed Mar. 27, 2020, all of which are hereby incorporated by reference herein in their entireties.

BACKGROUND

Field

The present disclosure relates to a liquid replenishing system including a liquid tank and a liquid storage bottle for storing liquid to be replenished to the liquid tank.

Description of the Related Art

Some liquid tanks used in liquid ejection apparatuses such as inkjet recording apparatuses can replenish liquid from a separately prepared liquid storage bottle through an injection port for injecting the liquid. In such a liquid replenishment system, in order to prevent the liquid to be replenished from flowing out of the liquid tank during replenishing operation, it is desirable to perform the liquid replenishment with the liquid storage bottle secured to the injection port of the liquid tank. Japanese Patent Application Laid-Open No. 2017-65084 discloses a technique for securing a liquid injection container to a liquid tank by an engagement mechanism provided between a cylindrical wall that defines an injection port formed on an inclined surface of the front face of the liquid tank and a spout of a liquid injection container. In this technique, the liquid injection container can be secured to the liquid tank by inserting a spout of the liquid injection container into an injection port of the liquid tank, and engaging a claw provided on an arm projecting from the outer peripheral surface of the spout with an annular protrusion provided on the outer peripheral surface of a cylindrical wall. Then, by compressing the liquid injection container, the liquid retained inside can be replenished to the liquid tank.

However, in the technique described in Japanese Patent Application Laid-Open No. 2017-65084, the user needs to determine the timing for ending the liquid replenishing operation by himself/herself while visually confirming the amount of replenished liquid. Therefore, if the timing is misjudged, the liquid may overflow from the injection port of the liquid tank. Further, in the technique described in Japanese Patent Application Laid-Open No. 2017-65084, while the gas-liquid exchange inside the liquid tank is performed through a gap between the inner peripheral surface of the cylindrical wall and the spout, the gas-liquid exchange is not sufficiently promoted in such a gap so that smooth replenishment of liquid may not be realized.

SUMMARY

According to an aspect of the present disclosure, a liquid replenishing system includes a liquid tank having (i) a tank body, (ii) a cylindrical adapter provided on an inclined surface connecting an upper surface and a side surface of the tank body, and having an inner peripheral surface fittable to an outer peripheral surface of a nozzle, and (iii) a needle penetrating into the tank body inside the cylindrical adapter, wherein one end of the needle is located outside the tank body and another end of the needle is located inside the tank body, and wherein the needle includes two fluid channels running parallel with each other in the needle, and a liquid storage bottle for storing liquid to be replenished to the liquid tank, wherein the liquid storage bottle includes (i) a bottle body, (ii) the nozzle, wherein the nozzle includes an ejection port for ejecting a liquid stored in the bottle body, and (iii) a slit valve provided at the ejection port and having a plurality of slits intersecting with each other, wherein, in a case where the nozzle of the liquid storage bottle and the cylindrical adapter of the liquid tank are fitted to each other, one end of the needle is inserted into the slit valve so that the liquid storage bottle is secured to the liquid tank.

In the present disclosure, the information describes features where a liquid replenishing system can smoothly and reliably perform liquid replenishment with a liquid storage bottle secured to a liquid tank. Further features of the present disclosure will become apparent from the following description of exemplary embodiments with reference to the attached drawings.

DESCRIPTION OF THE EMBODIMENTS

Preferred embodiments of the present disclosure will now be described in detail in accordance with the accompanying drawings.

Hereinafter, embodiments of the present disclosure will be described with reference to the drawings. In the present specification, description will be made by taking an example of a case where the liquid replenishing system of the present disclosure is used to replenish a liquid (ink) to a liquid ejection apparatus (inkjet recording apparatus). However, the use of the liquid replenishing system will not be limited thereto. Also, the liquid to be replenished is not limited to ink and may be, for example, a recording liquid, a fixing treatment liquid and a resist.

First Embodiment

Figure 1:
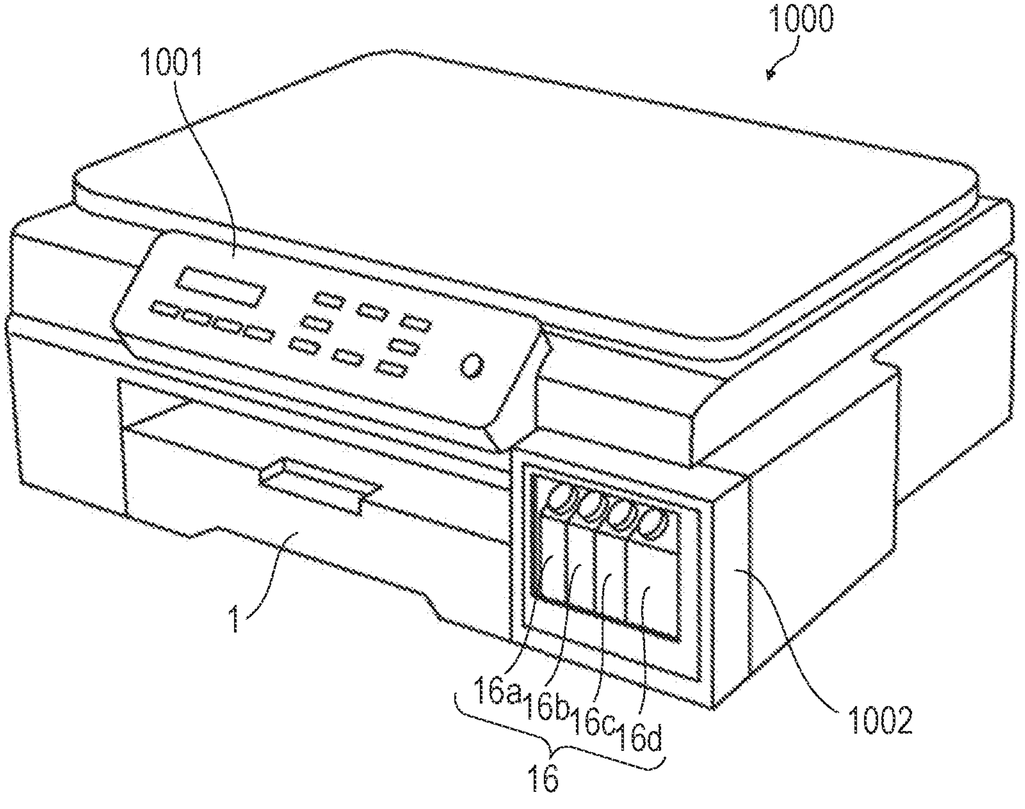
FIG. 1 is a perspective view of a recording apparatus according to a first embodiment.
Figure 2:
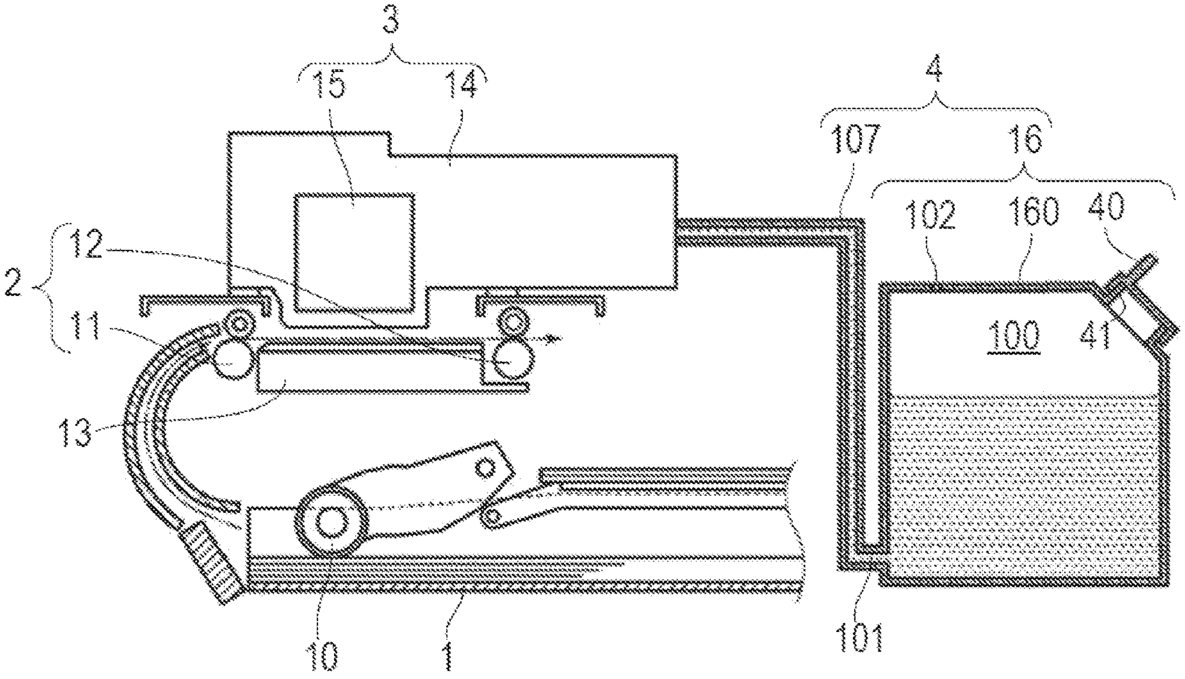
FIG. 2 is a side view to illustrate significant parts of the recording apparatus according to the first embodiment.

FIG. 1 is a perspective view of an inkjet recording apparatus according to a first embodiment of the present disclosure. FIG. 2 is a side view to schematically illustrate significant parts of the inkjet recording apparatus according to the present embodiment. An inkjet recording apparatus 1000 (hereinafter, also referred to as "recording apparatus") includes a first feeding section 1, a second feeding section 2, a recording section 3, and a liquid supply section 4. The first feeding section 1 has a feeding roller 10 that separates recording media one by one from a bundle of loaded recording media and supplies the separated recording media to the second feeding section 2. The second feeding section 2 includes a conveying roller 11 and a paper discharging roller 12 that are provided on the downstream side of the first feeding section 1 with respect to the conveying direction of the recording medium, and convey the recording media fed from the feeding roller 10. A platen 13 that supports the recording media transported by the second feeding section 2 from below is provided between the conveying roller 11 and the paper discharging roller 12. The recording section 3 includes a carriage 14 that is provided at a position facing the platen 13 and reciprocates in a direction orthogonal to the conveying direction of the recording medium, and a recording head 15 mounted on the carriage 14 and having a plurality of ejection port rows each having a plurality of ejection ports. With the energy generating elements provided corresponding to the ejection ports being driven based on the recording data, the recording head 15 ejects ink of different colors from each ejection port row, thus recording a color image on the recording medium supported by the platen 13.

The liquid supply section 4 includes a liquid tank 16 that is a semitransparent or transparent container, and a flexible supply tube 107 that connects the liquid tank 16 with the recording head 15. In the present embodiment, ink of four colors (cyan, magenta, yellow, and black) is used as the liquid, and as the liquid tank 16, four liquid tanks 16*a* to 16*d* (FIG. 1) that each store ink of respective colors are provided. The liquid tank 16 has a tank body 160 having a storage chamber 100 for storing a liquid therein, and a cap 40 having a seal portion 41 (FIG. 2) and a protrusion portion 42 (FIG. 3) where the cap 40 is attachable to the tank body 160 for sealing the storage chamber 100. A supply port 101 connected to a supply tube 107 is provided in the lower portion of the tank body 160, and an air communicating port 102 for communicating the storage chamber 100 with the atmosphere is provided on the upper surface of the tank body 160. When the liquid is ejected from the recording head 15, the negative pressure in the recording head 15 increases so that the liquid stored in the storage chamber 100 in the liquid tank 16 is supplied from the supply port 101 via the supply tube 107 to the recording head 15. At this time, the same amount of air as the liquid supplied to the recording head 15 flows into the storage chamber 100 in the liquid tank 16 through the air communicating port 102.

Figure 3:
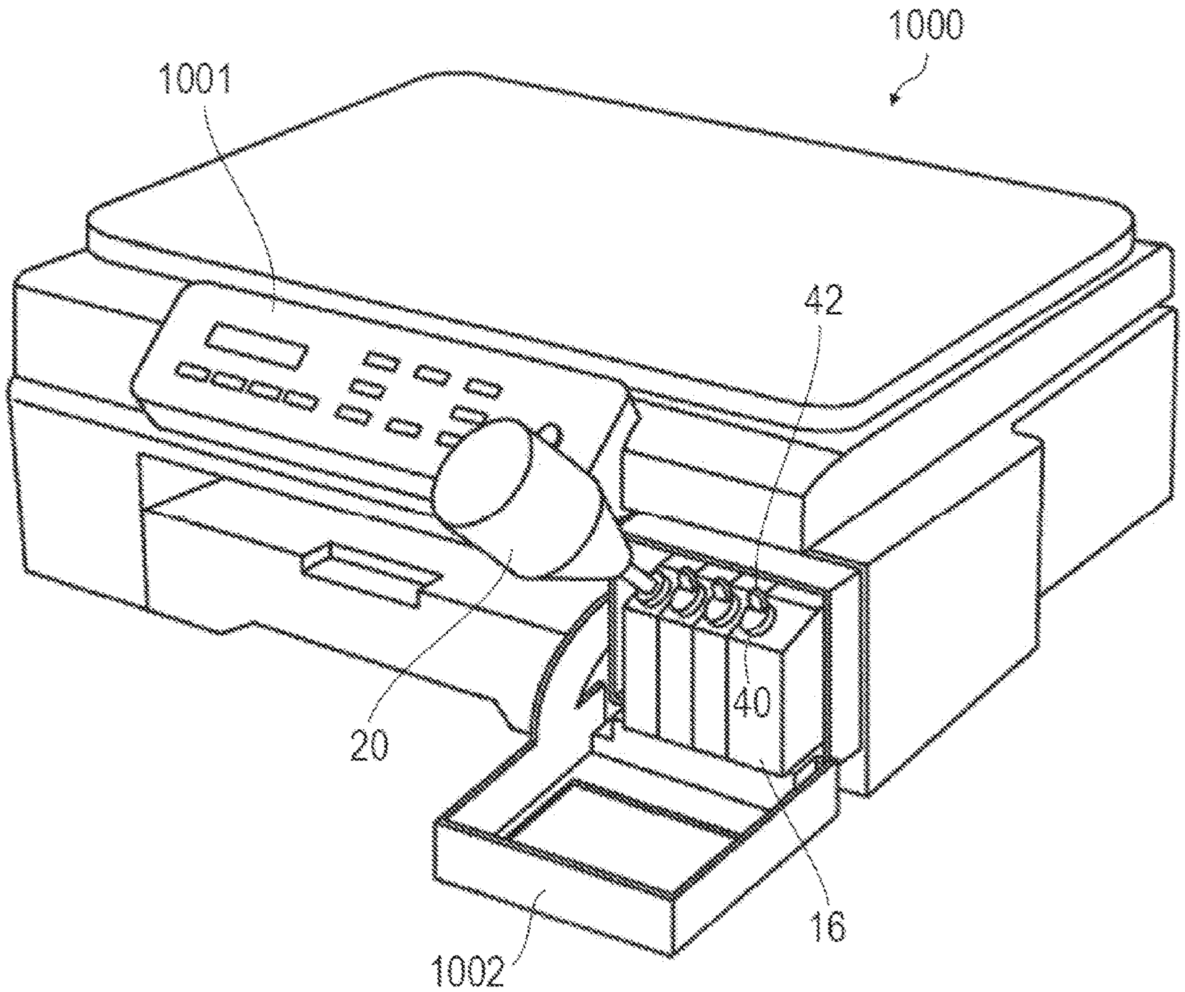
FIG. 3 is a perspective view to illustrate a situation at the time of liquid replenishing in the recording apparatus illustrated in FIG. 1.

FIG. 3 is a perspective view to illustrate a situation at the time of liquid replenishing in the recording apparatus illustrated in FIG. 1. When a remaining-amount detecting unit (not shown) provided in the liquid tank 16 detects that the remaining amount of the liquid in the storage chamber 100 is less than or equal to a predetermined amount, a message prompting the user to replenish the liquid to the liquid tank 16 is displayed on a display section 1001 of the recording apparatus 1000. The user causes a tank cover 1002 provided on the front face of the recording apparatus 1000 to tilt forward to be opened, removes the cap 40 attached to the liquid tank 16 to which the liquid is replenished, and exposes a liquid injection section 18 (see FIGS. 4A to 4C). Then, by using the liquid storage bottle 20 in which the liquid to be replenished is stored, the liquid is replenished to the liquid tank 16 through the exposed liquid injection section 18. A plurality of types (four types in the present embodiment) of liquid storage bottles 20 are prepared in advance according to the number of colors of the liquid (ink) to be used. Color information of the liquid (ink) stored inside is displayed on each liquid storage bottle 20. The user selects a liquid storage bottle 20 storing the liquid to be replenished from among the prepared plurality of liquid storage bottles 20 based on the display content of the display section 1001 as well as the color information displayed on the liquid tank 16.

Figure 4A:
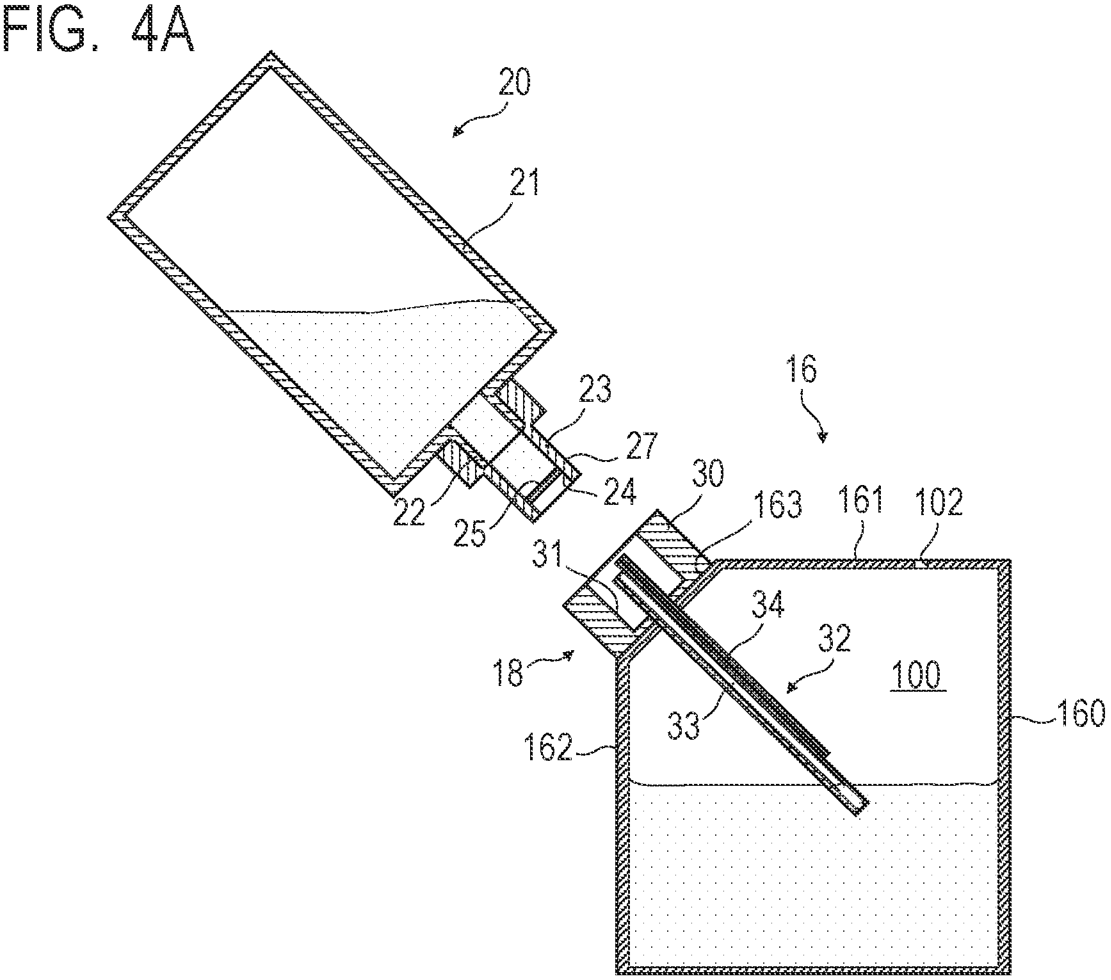
FIG. 4A is a sectional view of the liquid replenishing system according to the first embodiment.
Figure 4B:
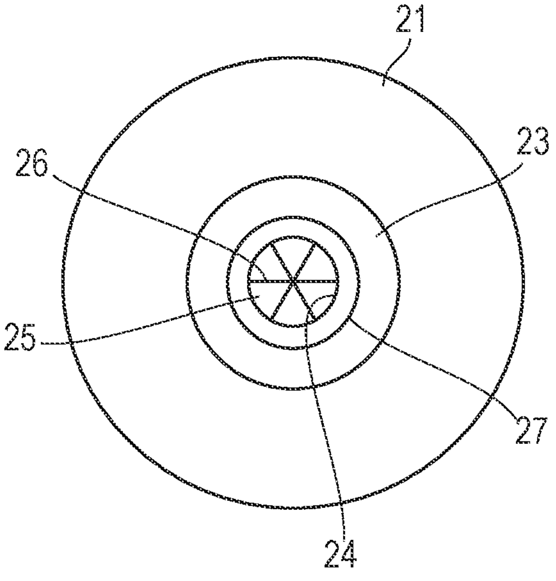
FIG. 4B is a plan view of the liquid replenishing system according to the first embodiment.
Figure 4C:
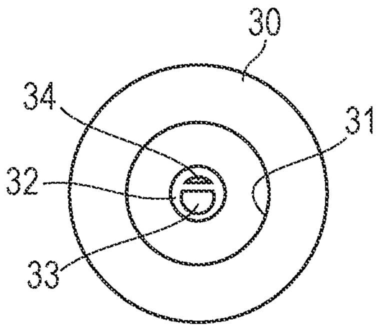
FIG. 4C is a plan view of the liquid replenishing system according to the first embodiment.

FIG. 4A is a sectional view of the liquid replenishing system according to the present embodiment. FIGS. 4B and 4C are plan views of a liquid storage bottle and a liquid tank each of which constitutes the liquid replenishing system of the present embodiment. The liquid replenishment system of the present embodiment includes a liquid tank 16 and a liquid storage bottle 20 for storing the liquid to be replenished to the liquid tank 16. The liquid tank 16 includes a tank body 160 substantially having a rectangular parallelepiped shape, and a liquid injection section 18 for injecting a liquid into the storage chamber 100 in the tank body 160. The liquid injection section 18 has a cylindrical adapter 30 and a needle 32 penetrating into the tank body 160 inside the adapter 30. The adapter 30 is provided on an inclined surface 163 formed between the upper surface 161 and the side surface 162 of the tank body 160 and, in the present embodiment, the adapter 30 is provided such that the central axis thereof is perpendicular to the inclined surface 163. Further, the adapter 30 has an inner peripheral surface 31 that is fittable to the outer peripheral surface 27 of the nozzle 23 of the liquid storage bottle 20 described later. The needle 32 has an upper end (one end) located outside the tank body 160 and a lower end (other end) located inside the tank body 160, and extends from the upper end to the lower end along the central axis of the adapter 30. Further, the needle 32 has two fluid channels 33 and 34 running parallel with each other inside the needle 32. The two fluid channels 33 and 34 include a first fluid channel 33, and a second fluid channel 34 located vertically above the first fluid channel 33, each of which is open at both ends, thus bringing the inside and the outside of the tank body 160 into communication. The two fluid channels 33 and 34 are formed such that the opening on the upper end side (one end side) of the first fluid channel 33 is located lower than the opening on the upper end side of the second fluid channel 34, and the flow-channel cross-sectional area of the first fluid channel 33 is larger than the flow-channel cross-sectional area of the second fluid channel 34. Further, the two fluid channels 33 and 34 are formed such that the opening on the lower end side (the other end side) of the second fluid channel 34 is located higher than the opening on the lower end side of the first fluid channel 33. Note that the expressions "high" and "low" in the present specification indicate heights in the gravitational direction at a posture in which the liquid replenishing system is used (the posture of FIG. 4A). That is, the upward in FIG. 4A is higher, and the downward is lower. Further, the tank body 160 and the adapter 30 may be joined by joining measures such as welding, adhesion, and screws, or may be integrally formed.

The liquid storage bottle 20 includes a cylindrical bottle body 21 for storing a liquid, and a nozzle 23 provided at a tip end portion 22 of the bottle body 21 and having an outer peripheral surface 27 that is fittable to an inner peripheral surface 31 of the adapter 30. The nozzle 23 has an ejection port 24 for ejecting the liquid stored in the bottle body 21, and at the ejection port 24, a slit valve 25 made from an elastic member such as a silicone film and for closing the ejection port 24 so as to be openable is provided. The slit valve 25 has a plurality of (three in the present embodiment) slits 26 that intersect with each other, and the plurality of slits 26 intersect with each other at an equal angle with the center of the slit valve 25 as a point of intersection. The slit valve 25 is provided on the tip end side of the nozzle 23 of the ejection port 24, and specifically, is provided at a position into which the upper end of the needle 32 can be inserted when the nozzle 23 and the adapter 30 are fitted to each other. Therefore, the slit valve 25 is normally closed and is opened when the nozzle 23 and the adapter 30 are fitted to each other. Note that the liquid storage bottle 20 and the nozzle 23 may be joined by joining measures such as welding, adhesion, and screws, or may be integrally formed.

Figure 5A:
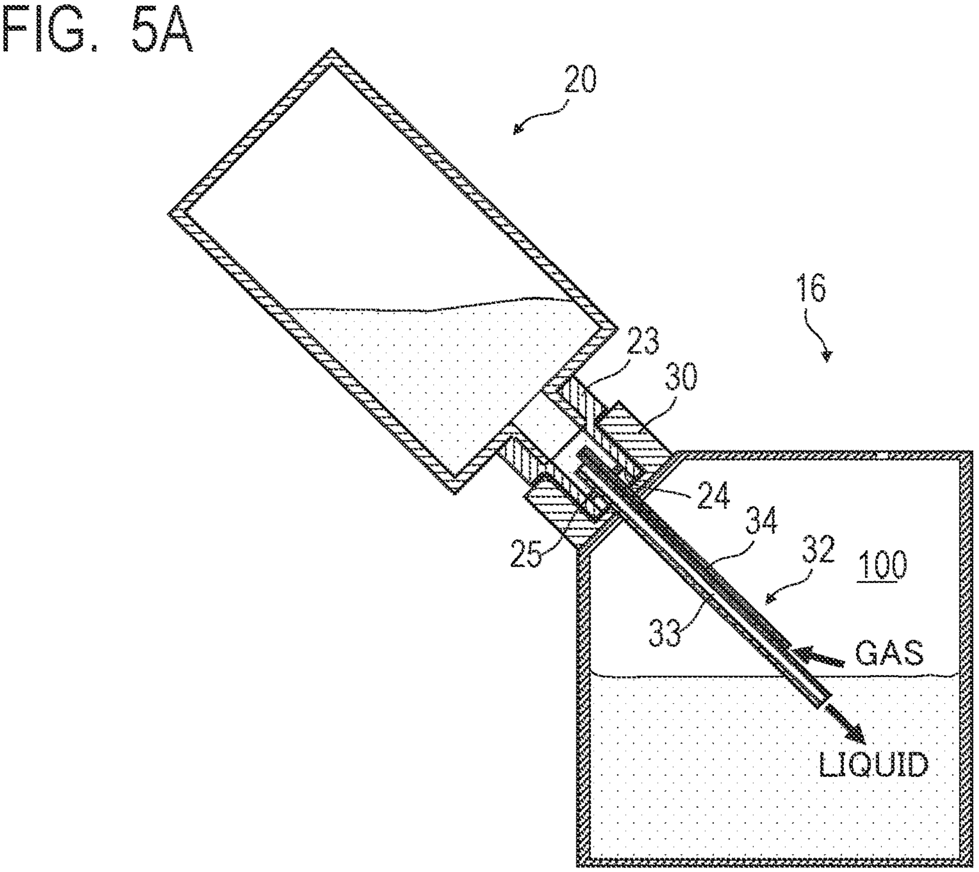
FIG. 5A is a sectional view to illustrate liquid replenishing operation according to the first embodiment.
Figure 5B:
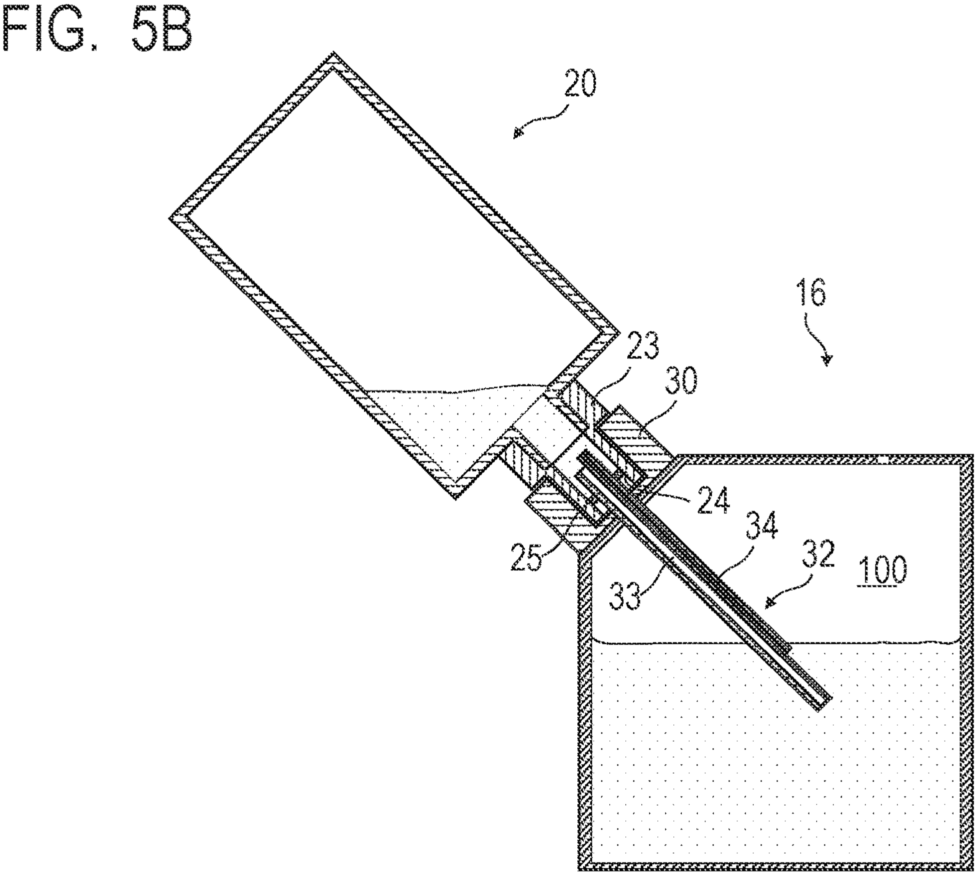
FIG. 5B is a sectional view to illustrate liquid replenishing operation according to the first embodiment.

FIGS. 5A and 5B are sectional views to illustrate liquid replenishing operation by the liquid replenishing system of the present embodiment. In the liquid replenishing operation, first, the user holds the liquid storage bottle 20 and fits the nozzle 23 to the adapter 30 of the liquid tank 16. When the nozzle 23 and the adapter 30 are fitted to each other, the upper end of the needle 32 is inserted into the slit 26 of the slit valve 25 provided at the ejection port 24, and the slit valve 25 is opened. At this time, only a small gap is formed between the nozzle 23 and the adapter 30. Therefore, as shown in FIG. 5A, the liquid storage bottle 20 is secured to the liquid tank 16 without being held by the user due to the fitting between the nozzle 23 and the adapter 30, and the insertion of the needle 32 into the slit 26 of the slit valve 25.

With the liquid storage bottle 20 being secured to the liquid tank 16, the liquid in the liquid storage bottle 20 flows into an internal space of the nozzle 23, to which the two fluid channels 33 and 34 are opened. At this time, as the channel through which the liquid flows, the first fluid channel 33, whose opening on the upper end side is located lower than that of the second fluid channel 34, and which has a large flow-channel cross-sectional area, is selected out of the two fluid channels 33 and 34 due to the influence of gravity. Thus, the liquid flows through the first fluid channel 33 and is injected into the storage chamber 100 inside the liquid tank 16. On the other hand, the air (gas) in the storage chamber 100 flows into the second fluid channel 34 as the liquid flows through the first fluid channel 33, and the air is fed into the liquid storage bottle 20 through the second fluid channel 34. As a result, gas-liquid exchange is reliably performed between the liquid tank 16 and the liquid storage bottle 20, and smooth liquid replenishing is realized. The liquid injected from the liquid storage bottle 20 starts filling the storage chamber 100 in the liquid tank 16, and finally closes the opening on the lower end side of the second fluid channel 34 that passes the gas as shown in FIG. 5B. As a result, gas-liquid exchange between the liquid tank 16 and the liquid storage bottle 20 becomes no longer performed, and the injection of liquid from the liquid storage bottle 20 into the liquid tank 16 can be automatically ended without the user visually confirming the replenishment amount of liquid. Therefore, the liquid will not overflow from the liquid tank 16. After the injection of liquid is ended, the replenishing operation of liquid is completed by the user removing the liquid storage bottle 20.

As so far described, according to the present embodiment, the liquid replenishing operation can be performed with the liquid storage bottle 20 being secured to the liquid tank 16, and therefore, the liquid can be prevented from flowing out of the liquid tank 16. Further, gas-liquid exchange between the liquid tank 16 and the liquid storage bottle 20 is sufficiently promoted by the two fluid channels 33 and 34 provided in the needle 32, thus bringing realization of smooth liquid replenishment. Further, since the gas-liquid exchange described above is automatically stopped by the liquid injected into the liquid tank 16 closing the opening on the lower end side of the second fluid channel 34, there is no need for the user to visually confirm the replenishment amount of liquid to determine the timing to end the replenishing operation of liquid. Note that the replenishment amount of liquid can be adjusted by adjusting the opening position (height) on the lower end side of the second fluid channel 34 that passes the gas. Therefore, for example, making the second fluid channel 34 as short as possible and placing the opening on the lower end side of the second fluid channel 34 as high as possible will allow replenishing the liquid to the liquid tank 16 nearly up to a full or predetermined level.

Second Embodiment

Figure 6:
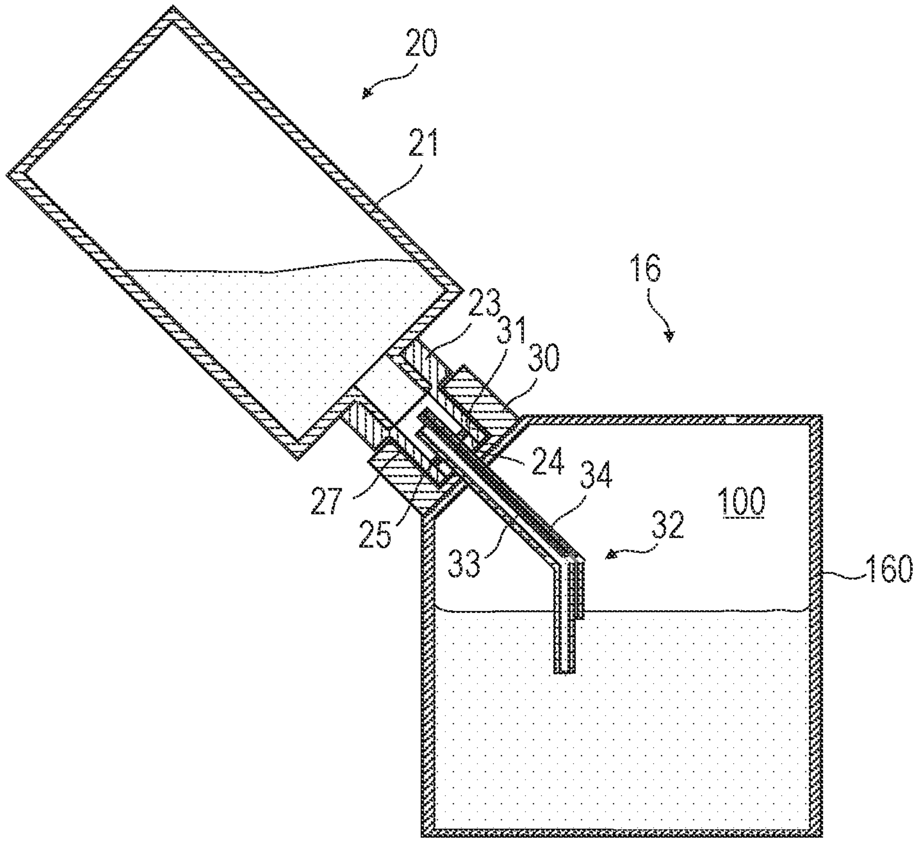
FIG. 6 is a sectional view of a liquid replenishing system according to a second embodiment.

FIG. 6 is a sectional view of a liquid replenishing system according to a second embodiment of the present disclosure. When the upper end of the needle 32 is located outside the tank body 160 and the lower end thereof is located inside the tank body 160, the needle 32 may not extend along the central axis of the adapter 30 over its entire length as in the first embodiment. The needle 32 of the present embodiment is bent halfway, and extends along the central axis of the adapter 30 on the upper end side thereof, while extending in the vertical direction on the lower end side thereof. With such a configuration, adjusting the opening position (height) on the lower end side of the second fluid channel 34 becomes easier as compared with the first embodiment, and the degree of freedom in design can be increased. Note that other configurations and effects of the present embodiment are the same as those of the first embodiment.

Third Embodiment

Figure 7A:
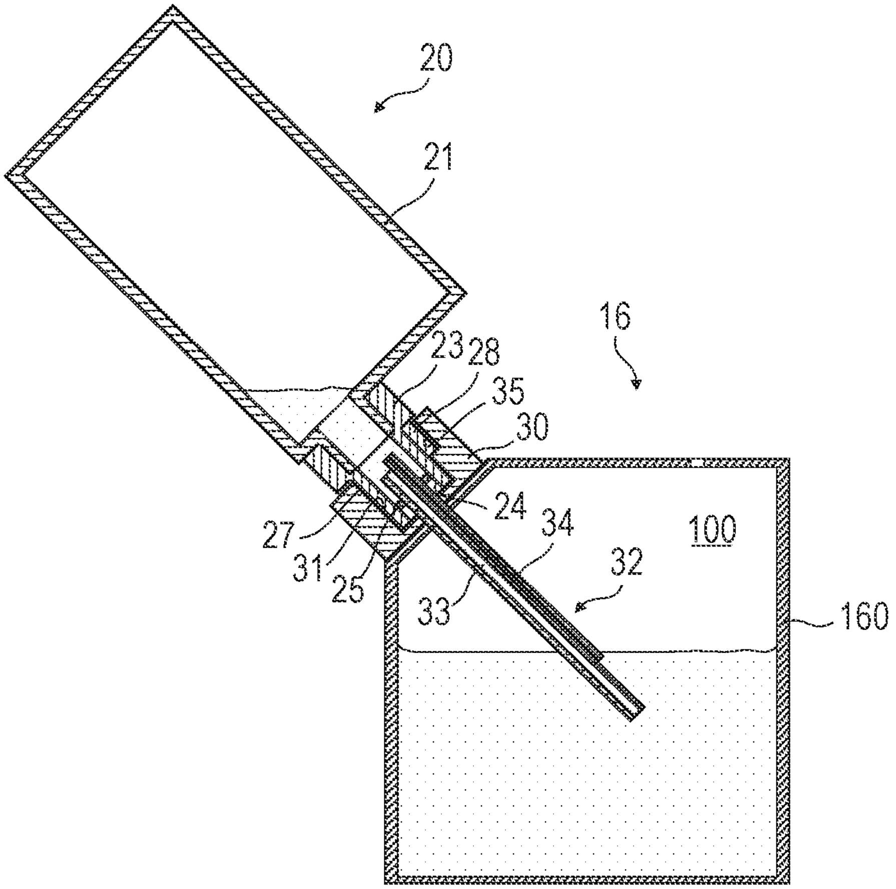
FIG. 7A is a sectional view of a liquid replenishing system according to a third embodiment.
Figure 7B:
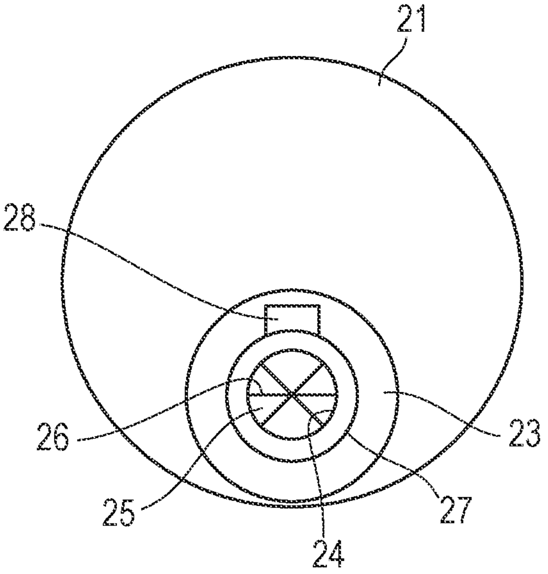
FIG. 7B is a plan view of the liquid replenishing system according to the third embodiment.
Figure 7C:
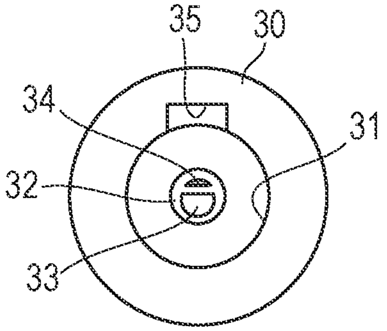
FIG. 7C is a plan view of the liquid replenishing system according to the third embodiment.

FIG. 7A is a sectional view of a liquid replenishing system according to a third embodiment of the present disclosure. FIGS. 7B and 7C are plan views of a liquid storage bottle and a liquid tank each of which constitutes the liquid replenishing system according to the present embodiment. In the embodiment described above, the nozzle 23 of the liquid storage bottle 20 is provided concentrically with the bottle body 21, but in the present embodiment, the nozzle 23 is provided at a position eccentric from the center of the bottle body 21. Along with this, positioning mechanisms 28 and 35 for positioning the nozzle 23 in the circumferential direction with respect to the adapter 30 are provided between the nozzle 23 and the adapter 30 (of the liquid tank 16). The positioning mechanisms 28 and 35 include a convex portion (first engaging portion) 28 formed on the outer peripheral surface 27 of the nozzle 23, and a concave portion (second engaging portion) 35 formed on the inner peripheral surface 31 of the adapter 30, and engageable with the convex portion 28 in the circumferential direction. The convex portion 28 is formed on the outer peripheral surface 27 of the nozzle 23 on the side opposite to the eccentric direction of the nozzle 23 with respect to the bottle body 21, and the concave portion 35 is formed on the uppermost portion of the inner peripheral surface 31 of the adapter 30 in the circumferential direction. The positions of the convex portion and the concave portion may be reversed, that is, the concave portion may be formed as the first engaging portion on the outer peripheral surface 27 of the nozzle 23, and the convex portion may be formed as the second engaging portion on the inner peripheral surface 31 of the adapter 30.

Such positioning mechanisms 28 and 35 allow disposing the nozzle 23 at a lower position of the bottle body 21 when the nozzle 23 and the adapter 30 are fitted to each other and the liquid storage bottle 20 is in a posture of being secured to the liquid tank 16. As a result, liquid using-up performance can be improved as compared with the first embodiment. Note that other configurations and effects of the present embodiment are the same as those of the first embodiment.

Fourth Embodiment

Figure 8:
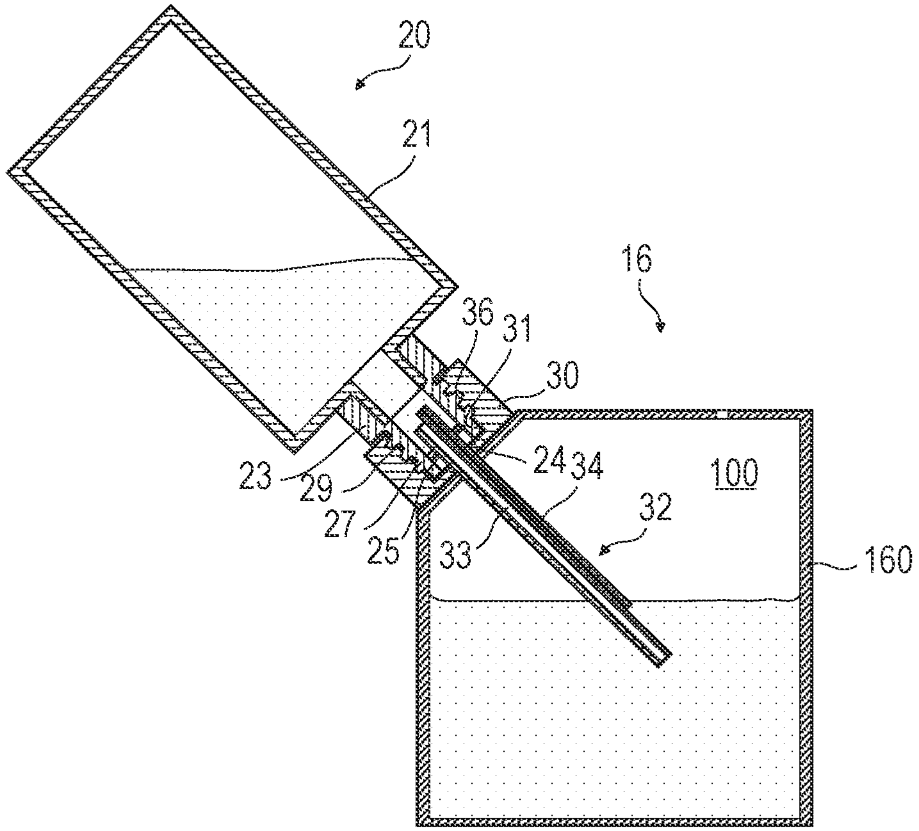
FIG. 8 is a sectional view of a liquid replenishing system according to a fourth embodiment.

FIG. 8 is a sectional view of a liquid replenishing system according to a fourth embodiment of the present disclosure. In the present embodiment, a male screw 29 is formed on the outer peripheral surface 27 of the nozzle 23, and a female screw 36 is formed on the inner peripheral surface 31 of the adapter 30 so that the nozzle 23 and the adapter 30 are fitted to each other by the male screw 29 of the nozzle 23 and the female screw 36 of the adapter 30 being screwed together. As a result, the liquid storage bottle 20 can be more firmly secured to the liquid tank 16 as compared with the first embodiment. Note that the other configurations and effects of the present embodiment are the same as those of the first embodiment.

Fifth Embodiment

Figure 9:
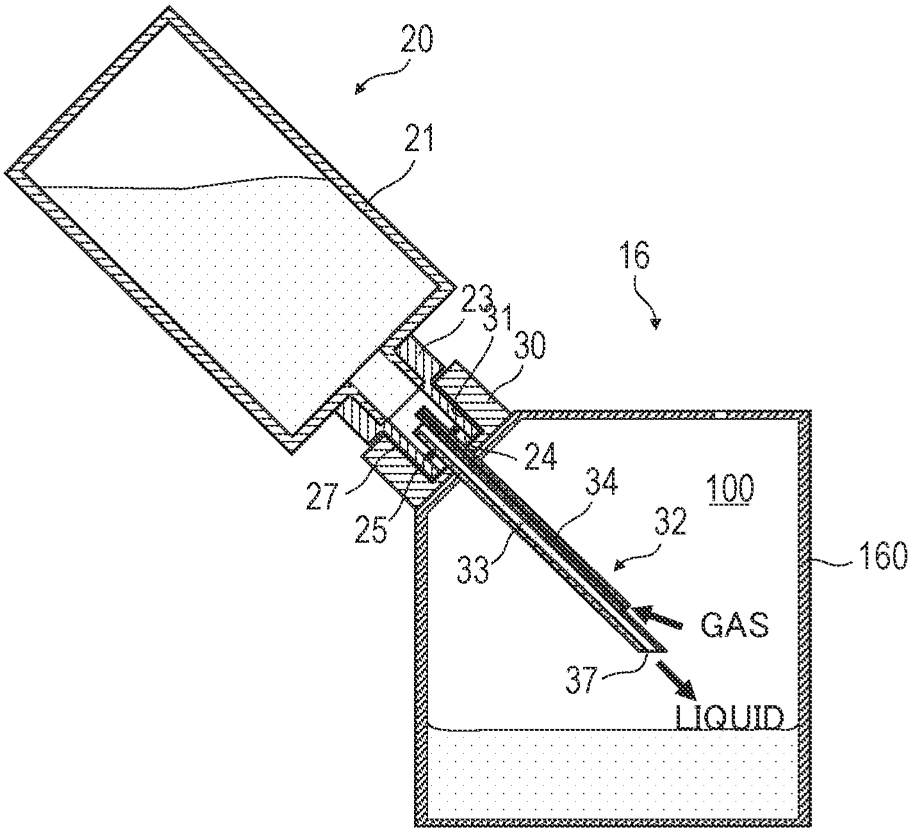
FIG. 9 is a sectional view of a liquid replenishing system according to a fifth embodiment.

FIG. 9 is a sectional view of a liquid replenishing system according to a fifth embodiment of the present disclosure. In the present embodiment, the first fluid channel 33 is formed such that an opening end face 37 on the lower end side is a horizontal plane. Due to such a configuration, in the present embodiment, since the liquid is more susceptible to the effect of gravity and the meniscus of the liquid becomes more likely to be broken in the vicinity of the opening on the lower end side of the first fluid channel 33, smoother liquid replenishing can be performed as compared with the first embodiment. Note that other configurations and effects of the present embodiment are the same as those of the first embodiment.

Sixth Embodiment

Figure 10:
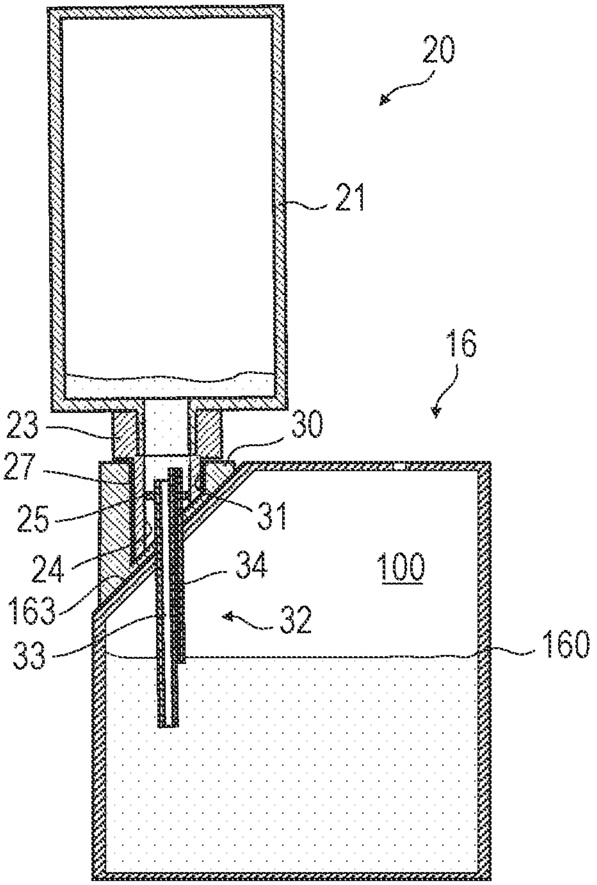
FIG. 10 is a sectional view of a liquid replenishing system according to a sixth embodiment.

FIG. 10 is a sectional view of a liquid replenishing system according to a sixth embodiment of the present disclosure. In the above described embodiment, the adapter 30 is supported at an end face perpendicular to the axial direction by the inclined surface 163 of the tank body 160 so that the central axis of the adapter 30 is perpendicular to the inclined surface 163. In contrast to this, in the present embodiment, the adapter 30 is supported at an end face inclined with respect to the axial direction by the inclined surface 163 such that the central axis of the adapter 30 is in parallel with the vertical direction. Accordingly, the needle 32 also extends vertically from the upper end to the lower end along the central axis of the adapter 30. Note that the present embodiment is similar to the above described embodiment in the point that the opening of the first fluid channel 33 is located lower than the opening of the second fluid channel 34 on the upper end side of the needle 32, and the opening of the second fluid channel 34 is located higher than the opening of the first fluid channel 33 on the lower end side of the needle 32. Further, the tip end of the nozzle 23 is also inclined with respect to the axial direction so as to follow the inclined surface 163 of the tank body 160 when fitted to the adapter 30. With such a configuration, in the present embodiment, when the nozzle 23 and the adapter 30 are fitted to each other, since the central axis of the liquid storage bottle 20 is also in parallel with the vertical direction, the liquid storage bottle 20 can be more stably secured to the liquid tank 16 compared with the first embodiment. Further, in the present embodiment, the nozzle 23 can be disposed at the lowest position of the bottle body 21 in a posture in which the liquid storage bottle 20 is secured to the liquid tank 16 so that liquid using-up performance can be improved as in the third embodiment. Note that other configurations and effects of the present embodiment are the same as those of the first embodiment. The present disclosure characterizes performing liquid replenishment smoothly and reliably with a liquid storage bottle being secured to a liquid tank.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An ink replenishing system for an inkjet recording apparatus having an inkjet recording head, the ink replenishing system comprising:
   - an ink tank configured to be disposed in the inkjet recording apparatus and to store ink to be supplied to the inkjet recording head; and
   - an ink storage bottle configured to store ink to be replenished to the ink tank,
   - wherein the ink tank has (i) an ink storage chamber having an inclined surface between an upper surface and a first side surface of the ink storage chamber, and has (ii) an ink injection portion to inject ink into the ink storage chamber,
   - wherein the ink injection portion has a cylindrical shape and is provided on the inclined surface such that a central axis of the ink injection portion is substantially perpendicular to the inclined surface,
   - wherein the ink storage bottle has (i) a cylindrical bottle body to store the ink, and (ii) an ink ejection portion to eject the ink stored in the cylindrical bottle body,
   - wherein the ink ejection portion is provided at one end of the cylindrical bottle body and has an outer peripheral surface configured to engage with an inner peripheral surface of the ink injection portion of the ink tank,
   - wherein, in a case that the outer peripheral surface of the ink ejection portion of the ink storage bottle engages with the inner peripheral surface of the ink injection portion of the ink tank, a first fluid channel and a second fluid channel are provided so as to communicate between the ink tank and the ink storage bottle, and thereby a gas-liquid exchange is performed between the ink tank and the ink storage bottle through the first fluid channel and the second fluid channel,
   - wherein a cap is removably provided on the ink injection portion of the ink tank to seal the ink storage chamber and is configured so that the ink injection portion can accept the injection of ink after the cap is moved,
   - wherein the cap is provided with a seal portion to seal the ink injection portion and has a protrusion portion protruding in a direction opposite to a side where the seal portion is provided, and
   - wherein the ink storage bottle has a portion to specify an upper position of the ink storage bottle in the direction of gravity when the ink storage bottle is attached to the ink tank.

2. The ink replenishing system according to claim 1, wherein the ink tank includes a semitransparent container.

3. The ink replenishing system according to claim 1, wherein the ink storage chamber has a substantially rectangular parallelepiped shape.

4. The ink replenishing system according to claim 1, wherein the ink storage bottle is self-standably secured to the ink tank when the ink ejection portion of the ink storage bottle and the ink injection portion of the ink tank are engaged with each other.

5. The ink replenishing system according to claim 1, wherein, in a case where the gas-liquid exchange is performed, the ink in the ink storage bottle is injected into the ink tank through the first fluid channel and cooperates with air in the ink tank to fed the air into the ink storage bottle through the second fluid channel.

6. The ink replenishing system according to claim 5, wherein the first fluid channel is lower in the direction of gravity than the second fluid channel.

7. The ink replenishing system according to claim 1, wherein the portion to specify the upper position of the ink storage bottle is provided on the outer peripheral surface of the ink storage bottle.

8. The ink replenishing system according to claim 1, wherein the inkjet recording apparatus is configured to eject a plurality of types of ink from the inkjet recording head, and the ink tank is a plurality of ink tanks corresponding to each of the plurality of types of ink.

9. The ink replenishing system according to claim 8, wherein at least one ink tank of the plurality of ink tanks has a width in a direction in which the plurality of ink tanks is arranged that is longer than the widths of the remaining plurality of ink tanks.

10. The ink replenishing system according to claim 9, wherein the at least one ink tank having the longer width is placed at an end in the direction in which the plurality of ink tanks is arranged.

11. The ink replenishing system according to claim 8, wherein the plurality of types of ink includes cyan ink, magenta ink, yellow ink, and black ink.

12. The ink replenishing system according to claim 1, wherein the ink storage chamber of the ink tank has an air communicating port that is on the upper surface of the ink storage chamber and is configured to communicate air between outside the ink storage chamber and inside the ink storage chamber.

13. The ink replenishing system according to claim 1,
   - wherein the ink storage chamber of the ink tank has a supply port configured to connect with a supply tube to supply the ink stored in the ink tank to the inkjet recording head, and
   - wherein the supply port is provided on a second side surface of the ink storage chamber opposite to the first side surface of the ink storage chamber.

14. The ink replenishing system according to claim 1, wherein the first fluid channel and the second fluid channel are provided in parallel to each other.

15. The ink replenishing system according to claim 14, wherein the first fluid channel and the second fluid channel are provided so as to be aligned with each other in a direction parallel to the inclined surface.

16. An ink replenishing system for an inkjet recording apparatus having an inkjet recording head, the ink replenishing system comprising:
   - an ink tank configured to be disposed in the inkjet recording apparatus and to store ink to be supplied to the inkjet recording head; and
   - an ink storage bottle configured to store ink to be replenished to the ink tank,
   - wherein the ink tank has (i) an ink storage chamber having an inclined surface between an upper surface and a first side surface of the ink storage chamber, and has (ii) an ink injection portion to inject ink into the ink storage chamber,
   - wherein the ink injection portion has a cylindrical shape and is provided on the inclined surface such that a central axis of the ink injection portion is substantially perpendicular to the inclined surface,
   - wherein the ink storage bottle has (i) a cylindrical bottle body to store the ink, and (ii) an ink ejection portion to eject the ink stored in the cylindrical bottle body,
   - wherein the ink ejection portion is provided at one end of the cylindrical bottle body and has an outer peripheral surface configured to engage with an inner peripheral surface of the ink injection portion of the ink tank, wherein, in a case that the outer peripheral surface of the ink ejection portion of the ink storage bottle engages with the inner peripheral surface of the ink injection portion of the ink tank, a first fluid channel and a second fluid channel are provided so as to communicate between the ink tank and the ink storage bottle, and thereby a gas-liquid exchange is performed between the ink tank and the ink storage bottle through the first fluid channel and the second fluid channel, wherein the ink tank includes a semitransparent container, wherein the ink storage chamber has a substantially rectangular parallelepiped shape, wherein the ink storage bottle is self-standably secured to the ink tank when the ink ejection portion of the ink storage bottle and the ink injection portion of the ink tank are engaged with each other, wherein, in a case where the gas-liquid exchange is performed, the ink in the ink storage bottle is injected into the ink tank through the first fluid channel and cooperates with air in the ink tank to feed the air into the ink storage bottle through the second fluid channel, wherein a cap is removably provided on the ink injection portion of the ink tank to seal the ink storage chamber and is configured so that the ink injection portion can accept the injection of ink after the cap is moved, wherein the cap is provided with a seal portion to seal the ink injection portion and has a protrusion portion protruding in a direction opposite to a side where the seal portion is provided, wherein the ink storage bottle has a portion to specify an upper position of the ink storage bottle in the direction of gravity when the ink storage bottle is attached to the ink tank, wherein the inkjet recording apparatus is configured to eject a plurality of types of ink from the inkjet recording head, and the ink tank is a plurality of ink tanks corresponding to each of the plurality of types of ink, wherein at least one ink tank of the plurality of ink tanks has a width in a direction in which the plurality of ink tanks is arranged that is longer than the widths of the remaining plurality of ink tanks, wherein the at least one ink tank having the longer width is placed at an end in the direction in which the plurality of ink tanks are arranged, wherein the plurality of types of ink includes cyan ink, magenta ink, yellow ink, and black ink, wherein the ink storage chamber of the ink tank has an air communicating port that is on the upper surface of the ink storage chamber and is configured to communicate air between outside the ink storage chamber and inside the ink storage chamber, wherein the ink storage chamber of the ink tank has a supply port configured to connect with a supply tube to supply the ink stored in the ink tank to the inkjet recording head, and wherein the supply port is provided on a second side surface of the ink storage chamber opposite to the first side surface of the ink storage chamber.

17. The ink replenishing system according to claim 1, wherein, in the case that the outer peripheral surface of the ink ejection portion of the ink storage bottle engages with the inner peripheral surface of the ink injection portion of the ink tank, the upper position of the ink storage bottle specified by the portion is orientated so that the second fluid channel is located vertically above the first fluid channel in the direction of gravity.

* * * * *